(12) United States Patent
Winterson et al.

(10) Patent No.: US 7,052,581 B2
(45) Date of Patent: May 30, 2006

(54) PROCESS OF PRODUCING MAGNESIUM AMMONIUM PHOSPHATE IN MONOHYDRATE FORM (DITTMARITE)

(75) Inventors: Warren D. Winterson, West Point, VA (US); John F. Cunningham, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 10/201,910

(22) Filed: Jul. 25, 2002

(65) Prior Publication Data

US 2003/0056913 A1    Mar. 27, 2003

Related U.S. Application Data

(60) Provisional application No. 60/308,865, filed on Aug. 1, 2001.

(51) Int. Cl.
*D21H 11/00* (2006.01)

(52) U.S. Cl. ............... 162/181.2; 162/181.1; 162/158; 162/139; 423/306

(58) Field of Classification Search ............. 162/139, 162/158, 164.6, 181.2, 181.1; 423/306, 162; 516/88; 71/33, 36, 64.08, 64.13
See application file for complete search history.

(56) References Cited

U.S. PATENT DOCUMENTS

| | | | |
|---|---|---|---|
| 3,126,254 A * | 3/1964 | Salutsky et al. ............ 423/306 |
| 3,141,732 A | 7/1964 | McCullough et al. |
| 3,285,731 A | 11/1966 | Salutsky et al. |
| 3,320,048 A | 5/1967 | Legal et al. |
| 3,348,910 A | 10/1967 | Goodenough et al. |
| 3,384,451 A * | 5/1968 | Volz ............ 423/306 |
| 3,459,530 A | 8/1969 | Hudson et al. |
| 3,476,510 A | 11/1969 | Kern et al. |
| 4,013,443 A | 3/1977 | Schuman |
| 4,153,441 A | 5/1979 | Guithues et al. |
| 4,402,986 A | 9/1983 | Sinkoff et al. |
| 4,436,555 A | 3/1984 | Sugama et al. |
| 4,457,773 A | 7/1984 | Sley |
| 4,460,555 A | 7/1984 | Thompson |
| 4,777,026 A | 10/1988 | Griffith |
| 4,828,495 A | 5/1989 | Bell et al. |
| 5,294,348 A | 3/1994 | Horny et al. |
| 5,374,294 A | 12/1994 | Moore |
| 5,595,597 A | 1/1997 | fogel et al. |
| 5,613,465 A | 3/1997 | Moore |
| 6,289,898 B1 * | 9/2001 | Fournier et al. ............ 131/365 |
| 6,476,082 B1 * | 11/2002 | Green ............ 516/88 |
| 6,506,805 B1 | 1/2003 | Green et al. |
| 2002/0114753 A1 | 8/2002 | Green et al. |

FOREIGN PATENT DOCUMENTS

| | | |
|---|---|---|
| BE | 692895 | 7/1967 |
| SU | 1234362 A | 5/1986 |
| WO | WO 02/14218 | 2/2002 |

OTHER PUBLICATIONS

Notification of Transmittal of International Preliminary Examination Report for PCT/US02/24012 dated Nov. 12, 2003.
Written Opinion for PCT/US02/24012 dated Feb. 27, 2003.
Asok K. Sarkar, Phosphate Cement -Based Fast-Setting Binders, Ceramic Bulletin, vol. 69, No. 2, 1990, pp. 234-238, USA.
A.K. Sakar, Hydration/dehydration Characteristics of Struvite and Dittmarite Pertaining to Magnesium Ammonium Phosphate Cement Systems, J. Mater. Science, vol. 26, pp. 2514-2518, Chapman and Hal ltd. 1991.
F. Abbona et al., Crystallization of Two Magnesium Phosphates, Struvite and Newberylte: Effect of pH and concentration, Journal of Crystal Growth 57 (1982), pp. 6-14, North-Holland Publishing company.
A.W. Frazier et al., the Phase System $MgO-(NH_4)_2O-P_2O_5-H_2O$ at 25° C: Chemical Research Department, Tennessee Valley Authority; Ind Eng. Chem. Res., vol. 31, No. 8, 1992, pp. 2065-2068.

* cited by examiner

*Primary Examiner*—Dionne Walls Mayes
(74) *Attorney, Agent, or Firm*—Buchanan Ingersoll PC

(57) ABSTRACT

A process for converting the more easily synthesized and stored AMP hexahydrate into monohydrate of high purity. The resultant monohydrate (dittmarite) can then be either dried to stabilize it, or used directly in cigarette production such as paper making as filler or a filler component together with calcium carbonate.

24 Claims, 1 Drawing Sheet

PROCESS OF PRODUCING MAGNESIUM AMMONIUM PHOSPHATE IN MONOHYDRATE FORM (DITTMARITE)

This application claims priority under 35 U.S.C. § 119 to U.S. Provisional Application No. 60/308,865 entitled PROCESS OF PRODUCING MAGNESIUM AMMONIUM PHOSPHATE IN MONOHYDRATE FORM (DITTMARITE) and filed on Aug. 1, 2001, the entire content of which is hereby incorporated by reference.

FIELD OF THE INVENTION

The present invention relates to methods of producing magnesium ammonium phosphate in monohydrate form (dittmarite), and in particular to methods of converting a hexahydrate form of magnesium ammonium phosphate (struvite) into a monohydrate form of magnesium ammonium phosphate monohydrate (dittmarite).

BACKGROUND OF THE INVENTION

Ammonium magnesium phosphate (AMP) monohydrate has been discovered as useful in producing reduced harm smoking articles. Advantageous uses of AMP in smoking articles is described in commonly assigned U.S. patent application Ser. No. 09/399,159, which is incorporated herein by reference in its entirety.

SUMMARY OF THE INVENTION

The present invention provides a process for converting the more easily synthesized and stored AMP hexahydrate into monohydrate of high purity. The resultant monohydrate (dittmarite) can then be either dried to stabilize it, or used directly in cigarette production such as paper making as a filler or a filler component together with calcium carbonate.

More particularly, a preferred embodiment of the present invention provides a process wherein AMP hexahydrate is heated under pressure to convert it to the monohydrate form. In a preferred process, an aqueous slurry of AMP hexahydrate is heated in a pressure vessel (e.g., autoclave) to 100° C. to 110° C. with agitation under pressures from 1 psig to 15 psig.

DETAILED DESCRIPTION OF THE PREFERRED EMBODIMENTS

Figure 1:
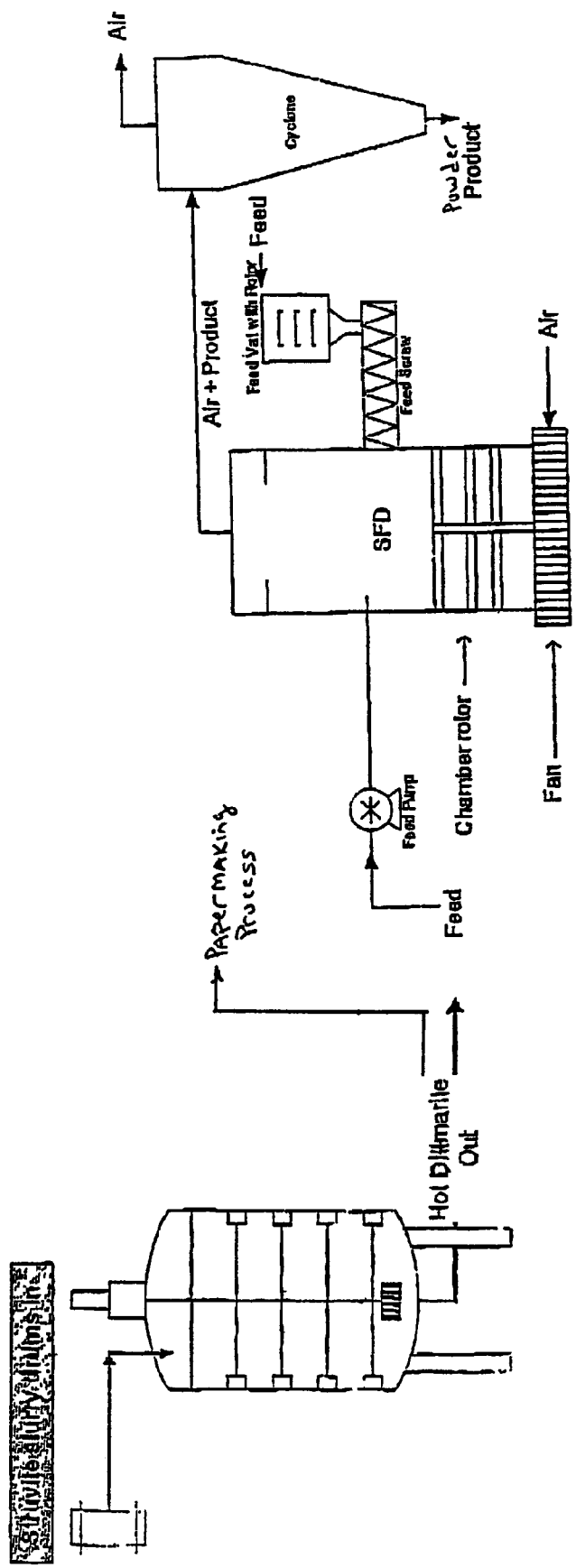
FIG. 1 shows a layout of processing equipment for effecting the conversion process and subsequent use of the monohydrate form of magnesium ammonium phosphate.

Table 1 sets forth parameters used in preparing high purity AMP monohydrate (dittmarite) by converting AMP hexahydrate (struvite) under elevated temperature and pressure. The test runs were carried out using an aqueous slurry having a solids content of 35 wt. % struvite in autoclave equipment available from Lee Industries in Philipsburg, Pa.

TABLE 1

| Run | Temperature ° C. | Time Minutes | Pressure Psig | Volume Gallons |
|---|---|---|---|---|
| 1 | 100 | 60 | 8 | 25 |
| 2 | 105 | 35to200 | 12 | 50 |
| 3 | 105 | 40 | 15 | 45 |

Runs 2 and 3 exhibited higher purity (i.e., higher conversion rates) results than Run 1, indicating the reaction should preferably be run at 105° C. and 12 to 15 psig. The product of the reaction can be used as a slurry or the slurry can be dried to provide the dittmarite in particle form. In a paper making operation, the dittmarite can be supplied directly to a tank in which the dittmarite is mixed with one or more components of the paper making feedstock, preferably at a temperature and/or pressure sufficient to maintain stability of the reaction product. In a cigarette paper making process, the overall process steps can include:

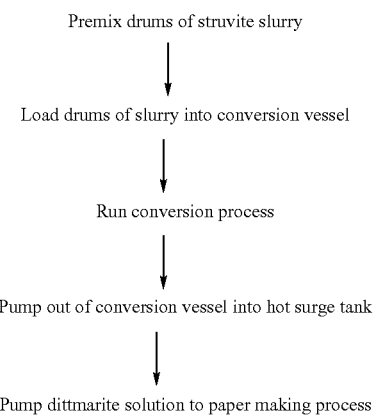

The pressure vessel has a jacket for heating and cooling, is rated for pressure operation, is of sanitary construction for easy clean up, and has at least one agitator, e.g. two agitators. One agitator scrapes the walls and creates a uniform temperature mixture, the second uses high shear to break up agglomerates and control particle size. This vessel is a preferred embodiment of the invention due to its high degree of temperature uniformity, and ability to control particle size, a critical parameter of paper making. Details of operating such a vessel can include:

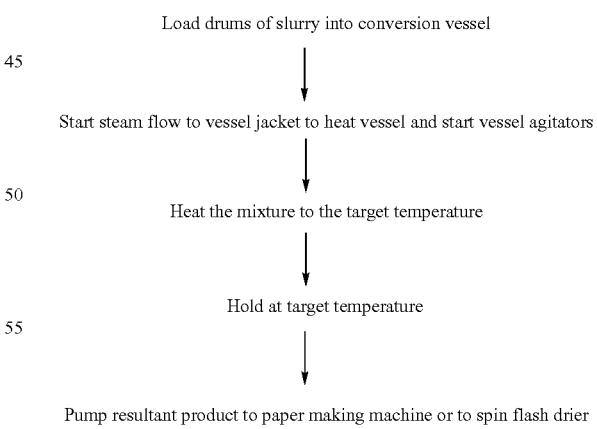

The conversion process is preferably run without intentional venting of pressure, or unintentional leaks, as undesirable side reactions may occur and the purity of the resultant product is reduced. Preferably, the slurry is contained in a sealed vessel during heating of the slurry. Preferably, the tank is in a filled condition during the conversion process. The conversion process is effective to product at least 95%, preferably at least 95% or 98% or higher conversion of struvite to dittmarite. It is recognized that the initial slurry may contain additional ingredients and/or impurities that may be present provided such ingredients/impurities do not adversely affect the conversion process.

In a preferred process, a slurry of up to 50%, preferably 20 to 40 weight % solids of hexahydrate form of magnesium ammonium phosphate is heated under pressure of up to 25 psig, preferably 10 to 15 psig, for time sufficient to convert at least 90%, preferably at least 95%, of the hexahydrate form of the magnesium ammonium phosphate to the monohydrate form thereof. The slurry can be heated to 90 to 135° C., preferably 100 to 110° C., for at least 5 minutes, preferably 5 to 25 minutes, to effect the conversion to monohydrate magnesium ammonium phosphate. The slurry can optionally be cooled but preferably not below a temperature at which the monohydrate magnesium ammonium phosphate will convert back to hexahydrate magnesium ammonium phosphate. Thus, the slurry of monohydrate magnesium ammonium phosphate is preferably maintained above 55° C., preferably above 60° C. until the slurry is further processed such as by incorporation into paper or by drying the slurry to obtain particles of magnesium ammonium phosphate. FIG. 1 shows a layout of processing equipment suitable for effecting the conversion process and subsequent use of the dittmarite.

The monohydrate form of magnesium ammonium phosphate is desirable in paper making manufacture such as cigarette paper. The slurry of the monohydrate form of magnesium ammonium phosphate can be mixed with feedstock of a paper making machine or the slurry can be dried to particle form (e.g., powder) and such powder can be incorporated in the paper making feedstock. In order to prevent the magnesium ammonium phosphate in the monohydrate form from transforming back to the hexahydrate form, it is desirable to maintain the slurry above 55° C. until it is incorporated directly in feedstock (preferably heated above 60° C.) of the paper making machine or until the slurry is dried into particle form such as by flash drying which removes the water from the slurry under elevated temperature conditions. Once dry, the monohydrate form of the magnesium ammonium phosphate remains stable.

The struvite slurry hexahydrate magnesium ammonium phosphate can be obtained by any known processes of reacting magnesium hydroxide, ammonia, phosphoric acid and water. The present invention provides an advantageous and effective method of converting such slurry of hexahydrate form to the monohydrate form of magnesium ammonium phosphate usable to form filler for paper making wherein a particle size is preferably in the range of approximately 2 μm to 8 μm, more preferably in the range of 2 μm to 4 μm. If the slurry is dried to particle form, a preferred spin-flash drier can be obtained from APV Anhydro of Tonawanda, N.Y.

While the invention has been described in detail with reference to specific embodiments thereof, it will be apparent to those skilled in the art that various changes and modifications can be made, and equivalents employed, without departing from the scope of the appended claims.

What is claimed is:

1. A process of making a monohydrate form of magnesium ammonium phosphate, comprising:
   heating a slurry comprising a hexahydrate form of magnesium ammonium phosphate in a sealed autoclave under pressure for a time sufficient to convert the hexahydrate magnesium ammonium phosphate to the monohydrate form thereof, wherein the slurry is contained in the sealed autoclave during the heating of the slurry; and
   subsequent to the heating, mixing the slurry containing the monohydrate form of the magnesium ammonium phosphate with paper making feedstock during a paper making process.

2. The process as claimed in claim 1, further comprising agitation of the slurry.

3. The process as claimed in claim 1, wherein the slurry is heated to a temperature up to 150° C. under a pressure of up to 100 psig.

4. The process as claimed in claim 1, wherein the heating is carried out for a time sufficient to convert at least 95% of the magnesium ammonium phosphate in hexahydrate form to the monohydrate form thereof.

5. The process as claimed in claim 1, wherein the slurry includes 20 to 40 weight % of solids content prior to the heating step.

6. The process as claimed in claim 1, wherein the slurry is subjected to stirring during the heating step.

7. The process as claimed in claim 1, wherein the heating is carried out for at least 5 minutes.

8. The process as claimed in claim 1, wherein the heating is carried out for at least 10 minutes.

9. The process as claimed in claim 1, wherein the heating is carried out for at least 15 minutes.

10. The process as claimed in claim 1, wherein the slurry prior to the heating step has an average particle size of 4 to 7 μm and/or the slurry has a pH of at least 7.

11. The process as claimed in claim 1, wherein the paper making process is a cigarette paper making process.

12. The process as claimed in claim 1, wherein the slurry consists essentially of water and the hexahydrate form of magnesium ammonium phosphate.

13. The process as claimed in claim 3, wherein the slurry is heated to a temperature of 100° C. to 110° C. under a pressure of about 10 to 15 psig.

14. A process of making a monohydrate form of magnesium ammonium phosphate comprising:
   heating a slurry comprising a hexahydrate form of magnesium ammonium phosphate under pressure for a time sufficient to convert the hexahydrate magnesium ammonium phosphate to the monohydrate form thereof; and
   subsequent to the heating, cooling the slurry to a temperature above 55° C.

15. The process as claimed in claim 14, further comprising drying the slurry.

16. The process as claimed in claim 15, wherein the drying step is conducted with a spin-flash drier.

17. The process as claimed in claim 14, wherein subsequent to the heating the slurry containing the monohydrate form of the magnesium ammonium phosphate is mixed with paper making feedstock during a paper making process.

18. The process as claimed in claim 17, wherein the paper making process is a cigarette paper making process.

19. A process of making a monohydrate form of magnesium ammonium phosphate, comprising:
   a) heating a slurry comprising a hexahydrate form of magnesium ammonium phosphate under pressure for a time sufficient to convert the hexahydrate magnesium ammonium phosphate to the monohydrate form thereof; and b) subsequent to a), mixing the slurry containing the monohydrate form of the magnesium ammonium phosphate with paper making feedstock during a paper making process.

20. The process as claimed in claim 19, wherein the paper making process is a cigarette paper making process.

21. A process of making a monohydrate form of magnesium ammonium phosphate, comprising:

heating a slurry comprising a hexahydrate form of magnesium ammonium phosphate in a sealed vessel under pressure for a time sufficient to convert the hexahydrate magnesium ammonium phosphate to the monohydrate form thereof; and subsequent to the heating, mixing the slurry containing the monohydrate form of the magnesium ammonium phosphate with paper making feedstock during a paper making process.

22. The process as claimed in claim 21, wherein the paper making process is a cigarette paper making process.

23. A process of making a monohydrate form of magnesium ammonium phosphate, comprising:

heating a slurry comprising a hexahydrate form of magnesium ammonium phosphate to a temperature of 100° C. to 110° C. under a pressure of about 10 to 15 psig for a time sufficient to convert the hexahydrate magnesium ammonium phosphate to the monohydrate form thereof; and subsequent to the heating, mixing the slurry containing the monohydrate form of the magnesium ammonium phosphate with paper making feedstock during a paper making process.

24. The process as claimed in claim 23, wherein the paper making process is a cigarette paper making process.

* * * * *